A. SORENSON.
AGRICULTURAL IMPLEMENT.
APPLICATION FILED SEPT. 8, 1913.
1,102,448.
Patented July 7, 1914.
2 SHEETS—SHEET 1.
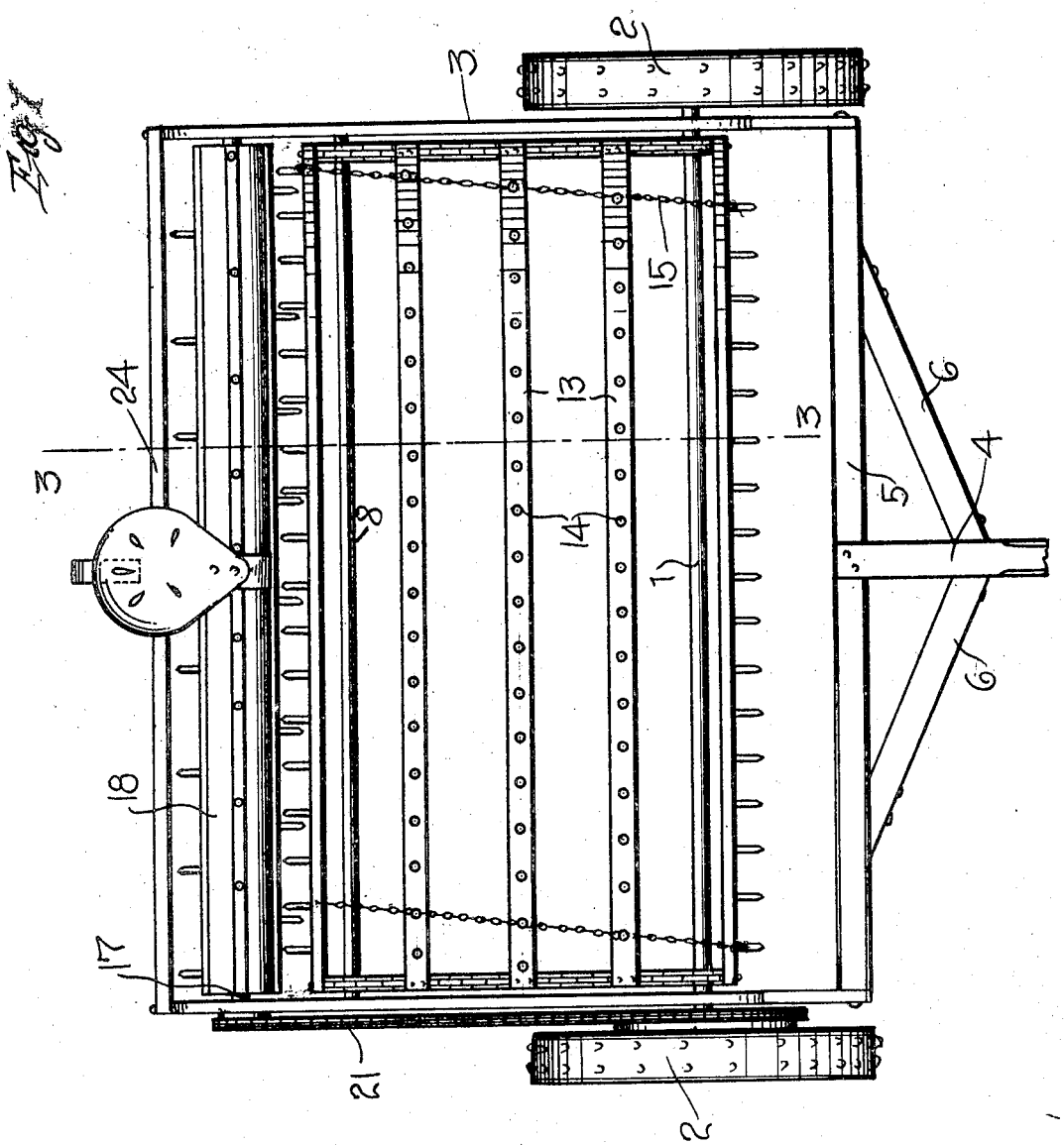
Inventor
ANDREW SORENSON
Witnesses
By Watson E. Coleman
Attorney A. SORENSON.
AGRICULTURAL IMPLEMENT.
APPLICATION FILED SEPT. 8, 1913.
1,102,448.
Patented July 7, 1914.
2 SHEETS—SHEET 2.
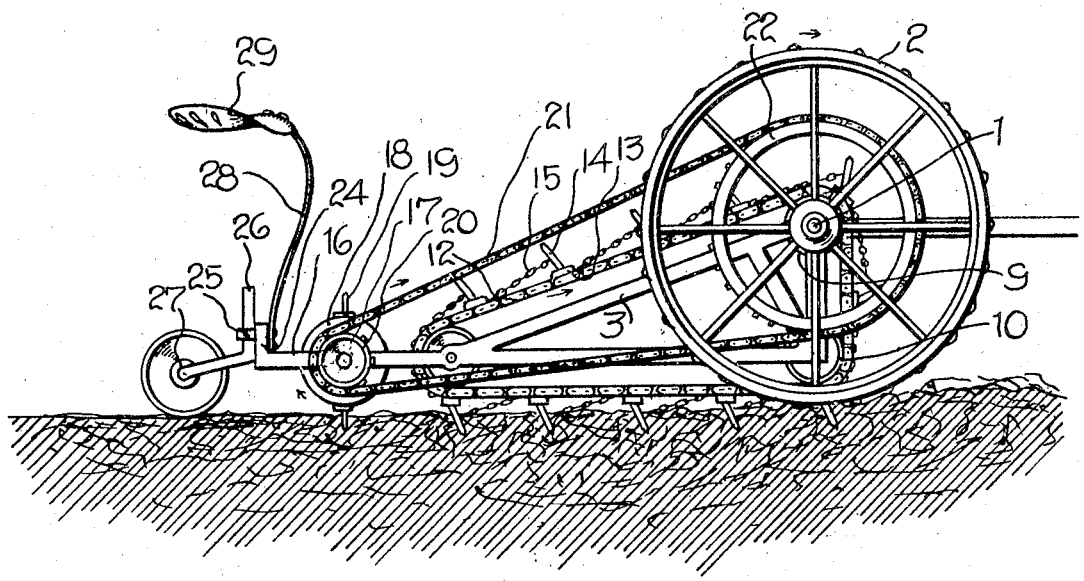
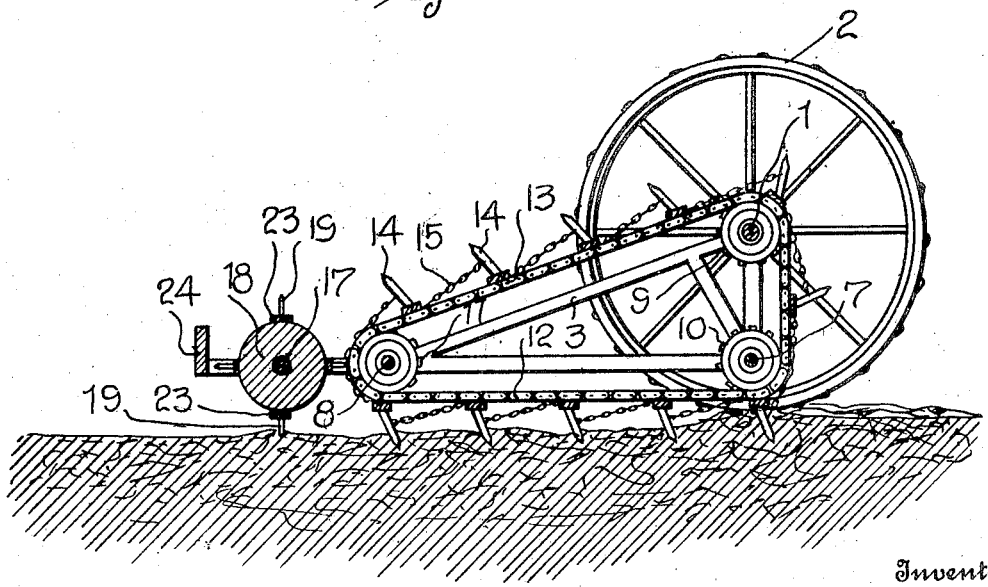
Inventor
ANDREW SORENSON

UNITED STATES PATENT OFFICE.

ANDREW SORENSON, OF MAIDEN ROCK, WISCONSIN.

AGRICULTURAL IMPLEMENT.

1,102,448.

Specification of Letters Patent.

Patented July 7, 1914.

Application filed September 8, 1913. Serial No. 788,787.

*To all whom it may concern:*

Be it known that I, ANDREW SORENSON, a citizen of the United States, residing at Maiden Rock, in the county of Pierce and State of Wisconsin, have invented certain new and useful Improvements in Agricultural Implements, of which the following is a specification, reference being had to the accompanying drawings.

This invention comprehends certain new and useful improvements in agricultural implements and relates more specifically to harrows.

An object of the invention is to provide a rotary harrow of improved and simplified construction and operation and which will be highly efficient and effective in use.

Another object is to provide a device of this character which will be composed of a small number of parts of simple construction and operation, including a plurality of connected transverse tooth carrying bars and means for presenting the teeth of the bars to the surface to be worked in succession, and a rotary tooth cleaning member.

A further object is to provide an implement of this character which will be of such construction that the teeth on one bar will be offset from the teeth on the adjacent bars and from the cleaning teeth of the rotary cleaning member.

A further object is to provide an implement of this character including a rotary cleaning member, the teeth of which not only serve to clean the harrow teeth of the tooth carrying bars but which also operate on the soil, thereby serving a double purpose.

This invention further has for an object to construct and connect the parts in such manner that the teeth of the transverse bars carried by the chains will have a dragging action, owing to slower rotation of the chains than the carrying or traction wheels.

A still further object is to generally improve and simplify the construction and operation of devices of this character and increase the efficiency thereof without materially increasing the cost of the same.

With the above and other objects in view, my invention consists in certain novel constructions, combinations, and arrangements of parts to be hereinafter more fully described, claimed, and illustrated in the accompanying drawings, in which, Figure 1 is a top plan view of my improved device; Fig. 2 is a side elevational view; and Fig. 3 is a vertical longitudinal section through the implement.

Referring more specifically to the drawings in which similar reference characters designate corresponding parts throughout the several views, 1 designates the axle and 2 the traction or ground wheels, it being understood that the axle 2 is mounted transversely through the forward upper edge of the triangular frame 3 and that the tongue 4 is suitably secured to the forward extension 5 of said frame and braced by the brace members 6. Within the lower front corner of the triangular frame 3 is also mounted the transverse shaft 7 while a similar shaft 8 is mounted in the lower rear edge of said frame. The sprocket wheels 9, 10, and 11, are arranged in pairs, respectively, upon the axle 1 and shafts 7 and 8. It will be understood that there are preferably two sprocket wheels 9 upon the axle 1 and adjacent the opposite ends thereof, but within the triangular frame 3. It will also be understood that the two sprocket wheels 10 are arranged in a similar manner on the shaft 7 and the sprocket wheels 11 arranged lengthwise upon the shaft 8.

I have provided a pair of sprocket chains 12 engaged around the corresponding sprocket wheels 9, 10, and 11, whereby said chains and sprocket wheels will be operated upon rotation of the axle 1. The tooth bars 13 are arranged transversely within the frame and have their opposite ends secured upon the spaced chains 12, said tooth bars 13 carrying the harrow teeth 14, the teeth 14 of each bar 13 being offset from the teeth of the adjacent bars. It will be understood that the harrow teeth 14 and bars 13 are held in proper positions by the short chains 15, each chain 15 having one end secured to a tooth 14 while its opposite end is secured to the tooth bar 13 immediately behind the bar by which said tooth is carried and at a point adjacent the corresponding tooth of the bar, thereby positioning each chain at an angle to the sides of the frame.

The triangular frame 3 has a rear extension 16 in the side members of which are mounted the opposite ends of the transverse shaft 17 carrying the cleaning roller 18 with the cleaning teeth 19 projecting radially therefrom and arranged in longitudinal rows with the teeth of each row offset from the other rows and from the teeth 14 on the tooth bars 13. The shaft 17 has one end projecting through one of the side members of the extension 16, with a sprocket wheel 20 mounted thereon, the sprocket chain 21 being engaged around said sprocket wheel 20 and around the large sprocket wheel 22 mounted upon the inner face of one of the traction or ground wheels 2. It will be understood that each row of cleaning teeth 19 is carried by a strip 23 which may be secured in any suitable manner to the roller 18.

It will be seen that upon operation of the implement, the teeth 14 of each tooth bar 13 after engagement with the surface to be worked, will pass between the cleaning teeth 19 projecting from the roller 18, which roller is rotating in a reverse direction from the direction in which the tooth bars 13 and teeth 14 carried thereby are moving while said teeth 14 are passing between the cleaning teeth 19, thereby thoroughly cleaning the harrow teeth 14. Owing to the manner in which the cleaning roller 18 is mounted, said roller will be rotated by the sprocket chain 21 during operation of the device and the cleaning teeth 10 of said roller will not only serve to clean the harrow teeth 14 but will also operate on the soil and thereby assist the harrow teeth 14 in their work of cultivating the soil. It will also be readily seen that, owing to slower rotation of the chains 12 than the carrying or traction wheels 2, the harrow teeth 14 have a dragging action, thereby greatly facilitating the work of cultivating the soil. The transverse bar 24 of the rear extension of the frame 3, has a bearing 25 mounted upon its outer face within which is loosely mounted the standard 26 having the caster 27 mounted upon its lower forked and horizontally directed end, whereby said caster 27 and standard 26 may readily turn when the implement is turned to either side. The seat support 28 has its lower end secured to the inner face of the transverse member 24 while a suitable seat 29 is mounted upon the upper end of said support.

From the foregoing, it will be apparent that I have provided an improved rotary harrow which will be of improved construction and operation as well as highly efficient and effective and strong and durable in use.

While I have shown the preferred embodiment of my invention, it will be understood that minor changes in the details of construction and arrangements of parts may be made within the scope of the appended claims without departing from the spirit of my invention or sacrificing any of the advantages of the same.

What I claim is:—

1. A device of the class described comprising a frame, an axle mounted in said frame, traction wheels carried by said axle, a pair of shafts mounted in said frame, sprocket wheels mounted on the axle, sprocket wheels mounted on the shafts, sprocket chains engaged around the corresponding sprocket wheels on the axles and shafts, tooth bars secured to said chains, teeth projecting laterally from the tooth bars, a roller mounted in said frame, means for rotating the roller, cleaning teeth carried by said roller and adapted for engagement between the teeth of the tooth bars to clean the last mentioned teeth during operation of the device, a seat mounted on said frame, and a caster mounted on said frame to support the rear portion thereof.

2. A device of the class described comprising a triangular frame, transverse shafts mounted in the lower angles of said frame, an axle mounted in the upper angle of said frame, traction wheels carried by the axle, a sprocket wheel carried by one of said traction wheels, a sprocket wheel mounted on said axle, sprocket wheels mounted on the shafts, sprocket chains engaged around the corresponding sprocket wheels of the shafts and axle, tooth bars carried by said chains, harrow teeth carried by said tooth bars, connections between the harrow teeth and the adjacent tooth bars, a tongue secured to said frame, a roller mounted in said frame, a sprocket wheel carried by said roller, a sprocket chain engaged over the last mentioned sprocket wheel and over the sprocket wheel carried by one of the traction wheels, and means carried by the roller for cleaning the harrow teeth during operation of the device.

3. A device of the class described comprising a frame, shafts mounted in the frame, an axle extending through the frame, sprocket wheels mounted on the shafts, sprocket wheels mounted on the axle, sprocket chains engaged around said sprocket wheels, tooth bars carried by said chains, teeth carried by said tooth bars, connections between each tooth bar and the teeth carried by the next bar to retain said bars and teeth in their proper relative positions during engagement of the teeth with the ground, ground wheels mounted on the axle, a tongue connected with the frame, a roller mounted upon the rear portion of the frame to support the same above the ground, a cleaning member mounted for rotation in the frame during operation of the device, and cleaning teeth carried by said cleaning member for engagement between the teeth mounted on the tooth bars to clean the same.

4. A device of the class described comprising a frame, shafts mounted in the frame, an axle extending through the frame, ground wheels carried on said axle, connections between the axle and the shafts to rotate the latter, tooth carrying bars carried by said connections, teeth mounted on said bars, a roller mounted in said frame, means for rotating said roller, and combined harrow and cleaning teeth carried by said roller, the teeth carried by the bars being adapted for engagement between the combined harrow and cleaning teeth of the roller during operation of the device to clean said teeth.

In testimony whereof I hereunto affix my signature in the presence of two witnesses.

ANDREW SORENSON.

Witnesses:
F. W. CARPENTER,
R. H. CARPENTER.